United States Patent [19]
Hane et al.

[11] Patent Number: 5,801,378
[45] Date of Patent: Sep. 1, 1998

[54] OPTICAL ENCODER DIFFRACTION GRATINGS FOR ELIMINATING DIFFRACTED LIGHT COMPONENTS

[75] Inventors: Kazuhiro Hane, Sendai; Atsushi Ieki; Keiji Matsui, both of Niwa-gun, all of Japan

[73] Assignee: Okuma Corporation, Nagoya, Japan

[21] Appl. No.: 818,451

[22] Filed: Mar. 17, 1997

[30] Foreign Application Priority Data

Mar. 19, 1996 [JP] Japan .................................. 8-062823

[51] Int. Cl.$^6$ .................................................. H01J 3/14
[52] U.S. Cl. ............................. 250/237 G; 250/231.14; 356/373
[58] Field of Search ........................ 250/231.13, 231.14, 250/231.15, 231.16, 231.18, 237 G, 237 R; 356/356, 395, 373

[56] References Cited

U.S. PATENT DOCUMENTS 5,661,295   8/1997   Fukui et al. ................. 250/231.14

FOREIGN PATENT DOCUMENTS

A-3-48122   3/1991   Japan .

*Primary Examiner*—Que Le
*Attorney, Agent, or Firm*—Oliff & Berridge, PLC

[57] ABSTRACT

The amount of the light beam passing through two diffraction gratings is output as an electrical signal by a photo detector. The amount of relative displacement of the diffraction gratings is detected according to the electric signal (output signal) that changes in proportion to the relative displacement. Groove portions and ridge portions are alternately arranged on the first diffraction grating, through which the light beam passes and undergoes wavefront modulation by mutual interference of the zeroth-order diffracted light. This eliminates interference of the zeroth-order diffracted light with a diffracted light of another order, and eliminates changes in the fundamental wave component of the output signal caused by changes in the gap between the two diffraction gratings. The output signal can be made not to include a high-order component by a predetermined modification to at least one of either the array pitch or width of a transparent portion in the second diffraction grating.

13 Claims, 13 Drawing Sheets

OPTICAL ENCODER DIFFRACTION GRATINGS FOR ELIMINATING DIFFRACTED LIGHT COMPONENTS

BACKGROUND OF THE INVENTION

1. Field of the Invention

This invention relates to an optical encoder for measuring relative positions based on a diffraction fringe formed by diffraction gratings.

2. Description of the Related Art

An optical encoder, wherein a photo detector is located behind a light emitting unit for emitting light and two diffraction gratings, detects light that has passed through the two diffraction gratings with the photo detector and detects the amount of movement based on a variation in light intensity caused by a relative displacement of the two diffraction gratings.

FIG. 12 shows an example of one of the aforementioned two diffraction gratings 10. Diffraction grating 10 includes transparent portions 12 that pass light and nontransparent portions 14 that do not pass light arranged alternately, that is, an amplitude modulation type of grating. The array pitch is called a grating pitch, and the widths of transparent portions 12 and nontransparent portions 14 are each one half the grating pitch P.

In the aforementioned encoder employing two diffraction gratings 10, when the respective transparent portions 12 coincide, the amount of passed light is at a maximum, and a detected output by the photo detector is also at a maximum. Conversely, when the positions of transparent portions 12 of one grating and the positions of nontransparent portions 14 of the other coincide, the amount of passed light is at a minimum, and the detected output by the photo detector is also at a minimum. An electric signal that is output from the photo detector varies between the aforementioned maximum and minimum values in proportion to a relative displacement of the two diffraction gratings 10. If the two diffraction gratings 10 are moved relative to each other at a uniform speed, the output signal obtained from the photo detector ideally becomes a triangular wave signal of period P. However, in reality, the aforementioned triangular waveform is distorted due to an influence of diffraction. This function is handled as a sine wave to perform detection of the relative displacement.

The optical encoder employing diffraction gratings 10 handles the output signal as a sine wave to determine the relative displacement. However, the output signal contains various distortion components. For this reason, when determining positional data at a precision smaller than the grating pitch, the amount of deviation from a sine wave due to the distortion components causes a position detection value to contain an error. The error created from the deviation between the actual output signal and a sine wave is called a interpolation.

Furthermore, the distortion rate of the displacement signal obtained by the aforementioned prior art optical encoder varies greatly as the gap between the first and second diffraction gratings changes. To limit the error to within a fixed value, it is necessary to keep the gap between the first and second diffraction gratings at an appropriate and fixed gap. The problem with this is that an extremely critical mounting precision is required.

Japanese Patent Laid-Open Publication No. Hei 3-48122 discloses an optical encoder for removing the third- and fifth-order harmonic components by having adjacent transparent portions at an unequal gap and arranging the transparent portions to have a predetermined phase difference in order to remove the distortion components in the output signal.

The pattern of the second diffraction grating is formed from the photo detector to enable the apparatus to be miniaturized.

In either of the aforementioned examples, interference components of zeroth-order diffracted light and first-order diffracted light in the diffraction grating through which light initially passes (hereinafter denoted as "first diffraction grating", and other as "second diffraction grating") form a fundamental wave component of the light intensity, that is, an output signal, the period of which is the grating pitch. When the gap between the two diffraction gratings changes, the changes of optical path lengths of the zeroth-order diffracted light and the first-order diffracted light created by the first diffraction grating differ. Therefore, the interference of the zeroth-order diffracted light and the first-order diffracted light changes, and the problem is that the amplitude of the fundamental wave component of the output signal changes. In other words, as shown in FIG. 13, the fundamental wave component of the output changes with the gap of the two diffraction gratings, and in extreme cases, the fundamental wave component disappears with the gap between the diffraction gratings at $P^2/2\lambda$. Accordingly, to obtain a satisfactory S/N ratio, the gap between the two diffraction gratings must be set so that the fundamental wave component is sufficiently large. However, a high degree of precision is required to set the gap between the two diffraction gratings to a desired value, and as a result, the problem is that the production cost of the apparatus is too high.

As another example, a method is available for obtaining a displacement signal by extracting and causing to interfere only diffracted light of order ±1 to created by a moving main scale. Causing the interference of diffracted light of order ±1 to interfere enables the change in the fundamental wave component to be eliminated even if the grating gap changes, since the amounts of change in the optical path lengths are equal, thereby solving the aforementioned problem. However, the apparatus becomes very complex and large in scale, due to such component as a spectroscopic device for selecting the diffracted light. Although a method is also available that achieves the same function by performing diffraction through three diffraction gratings, the same problem results as well as a problem where the drop in level is significant after three diffraction operations.

SUMMARY OF THE INVENTION

Taking the aforementioned reasons into consideration, the present invention was developed with an object to provide, in a compact and simple configuration at low cost, an encoder for outputting a stable sine wave displacement signal with low distortion where the fundamental wave component of the output signal of the displacement signal is independent of the gap between the two diffraction gratings.

To solve the aforementioned problems, the optical encoder related to this invention includes two diffraction gratings superimposed so that their relative positions cause the light intensity to change, a light receiving unit for detecting the light intensity that has passed through the two diffraction gratings and outputting an electric signal proportional to the light intensity, and an operation unit for calculating the relative displacement of the two diffraction gratings based on the output of the light receiving unit, where at least one of the two diffraction gratings is a phase grating alternately arranged with two regions to furnish a different phase change for each incident light beam, the phase change eliminating the zeroth-order component of the diffracted light created by the relevant phase grating.

According to this configuration, the zeroth-order diffracted light is removed through interference thereby eliminating the interference of the zeroth-order diffracted light with the diffracted light of another order, such as the diffracted light of order ±1. Therefore, the fundamental wave component of the displacement signal is independent of the gap between the two diffraction gratings and can be output in a stable manner. This enables high precision measurements.

Furthermore, at least one of the diffraction gratings can be a diffraction grating where the transmittance distribution in a direction along the grating pitch of the relevant diffraction grating does not include a predetermined high-order Fourier component with respect to the fundamental period of the grating pitch.

This transmittance distribution can be obtained by alternately arranging transparent portions that pass light and nontransparent portions that do not pass light. In particular, if widths W and W' of the transparent portions are expressed as:

$$W = P\left(\frac{n}{a} + \frac{1+2n'}{2b}\right)$$

$$W' = P\left(\frac{n}{a} - \frac{1+2n'}{2b}\right)$$

where P is the pitch of the transparent portions, and n and n' are integers, the high-order Fourier components in the transmittance distribution can be eliminated of the ath-order and bth-order components.

The ratio of the sum of the widths of the transparent portions to the sum of the widths of the nontransparent portions on the entire aforementioned other diffraction grating can be set to 1:1. In this case, the high even-order Fourier components can be removed.

According to this configuration, the zeroth-order diffracted light is removed through interference thereby eliminating the interference of the zeroth-order diffracted light with the diffracted light of another order, such as the diffracted light of order ±1. Therefore, the fundamental wave component of the displacement signal is independent of the gap between the two diffraction gratings and can be output in a stable manner. Since an output signal that does not include high-order components can be obtained, an error due to distortion of the output signal can be reduced.

An optical encoder of another aspect related to in this invention includes two diffraction gratings arranged together so that their relative positions cause the light intensity to change, a light receiving unit for detecting the light intensity that has passed through the two diffraction gratings and outputting an electric signal proportional to the light intensity, and an operation unit for calculating the relative displacement of the two diffraction gratings based on the output of the light receiving unit, where at least one of the two diffraction gratings is a phase grating alternately arranged with two regions to furnish a different phase change for each incident light beam, the phase change eliminating the zeroth-order component of the diffracted light created by the relevant phase grating, and further the relevant diffraction grating being a diffraction grating where the transmittance distribution in a direction along the grating pitch of the relevant diffraction grating does not include a predetermined high-order Fourier component for the fundamental period of the grating array, and the other diffraction grating being a diffraction grating having alternate transparent and nontransparent portions of equal widths.

The two regions furnishing the phase change are formed by providing a difference in the thickness of the two relevant regions. If widths W and W' of one region are expressed as:

$$W = P\left(\frac{n}{a} + \frac{1+2n'}{2b}\right)$$

$$W' = P\left(\frac{n}{a} - \frac{1+2n'}{2b}\right)$$

where P is the array pitch of the transparent portions, and n and n' are integers, the high-order Fourier components in the aforementioned transmittance distribution can be removed of the ath-order and bth-order components.

The ratio of the sum of the widths of the transparent portions to the sum of the widths of the nontransparent portions on the entire aforementioned other diffraction grating can be set to 1:1. In this case, the even high-order Fourier components can be removed.

According to still another aspect related to this invention, an optical encoder comprises two diffraction gratings arranged together so that their relative positions cause the light intensity to change, a light receiving unit for detecting the light intensity that has passed through the two diffraction gratings and outputting an electric signal proportional to the light intensity, and an operation unit for calculating the relative displacement of the two diffraction gratings based on the output of the light receiving unit, where one of the two diffraction gratings is a phase grating alternately arranged with two regions to furnish a different phase change for each incident light beam, the phase change removing the zeroth-order component of the diffracted light created by the relevant phase grating, and further the relevant diffraction grating being a diffraction grating where the transmittance distribution in a direction along the grating pitch of the relevant diffraction grating does not include a predetermined high-order Fourier component for the fundamental period of the grating array, and the other diffraction grating being a diffraction grating having alternate transparent and nontransparent portions of equal widths.

The two regions furnishing the phase change herein are formed by providing a difference in the thickness of the two relevant regions. The widths of these two regions are equal, and the array pitch of one region is shifted with respect to the fundamental array pitch P by P/(2•a), P/(2•b), and P/(2•a) +P/(2•b), thereby removing the ath-and bth-order Fourier components from the transmittance distribution.

Even in an optical encoder according to another aspect, the zeroth-order diffracted light is removed through interference thereby eliminating the interference of the zeroth-order diffracted light with the diffracted light of another order, such as the diffracted light of order ±1. Therefore, the fundamental wave component of the displacement signal is independent of the gap between the two diffraction gratings and can be output in a stable manner. Since an output signal that does not include high-order components can be obtained, an error due to distortion of the output signal can be reduced.

BRIEF DESCRIPTION OF THE DRAWINGS

Similar reference characters denote corresponding features consistently throughout the attached drawings, wherein.

DETAILED DESCRIPTION OF THE PREFERRED EMBODIMENTS

Preferred embodiments of this invention are described below with reference to the drawings.

Figure 1:
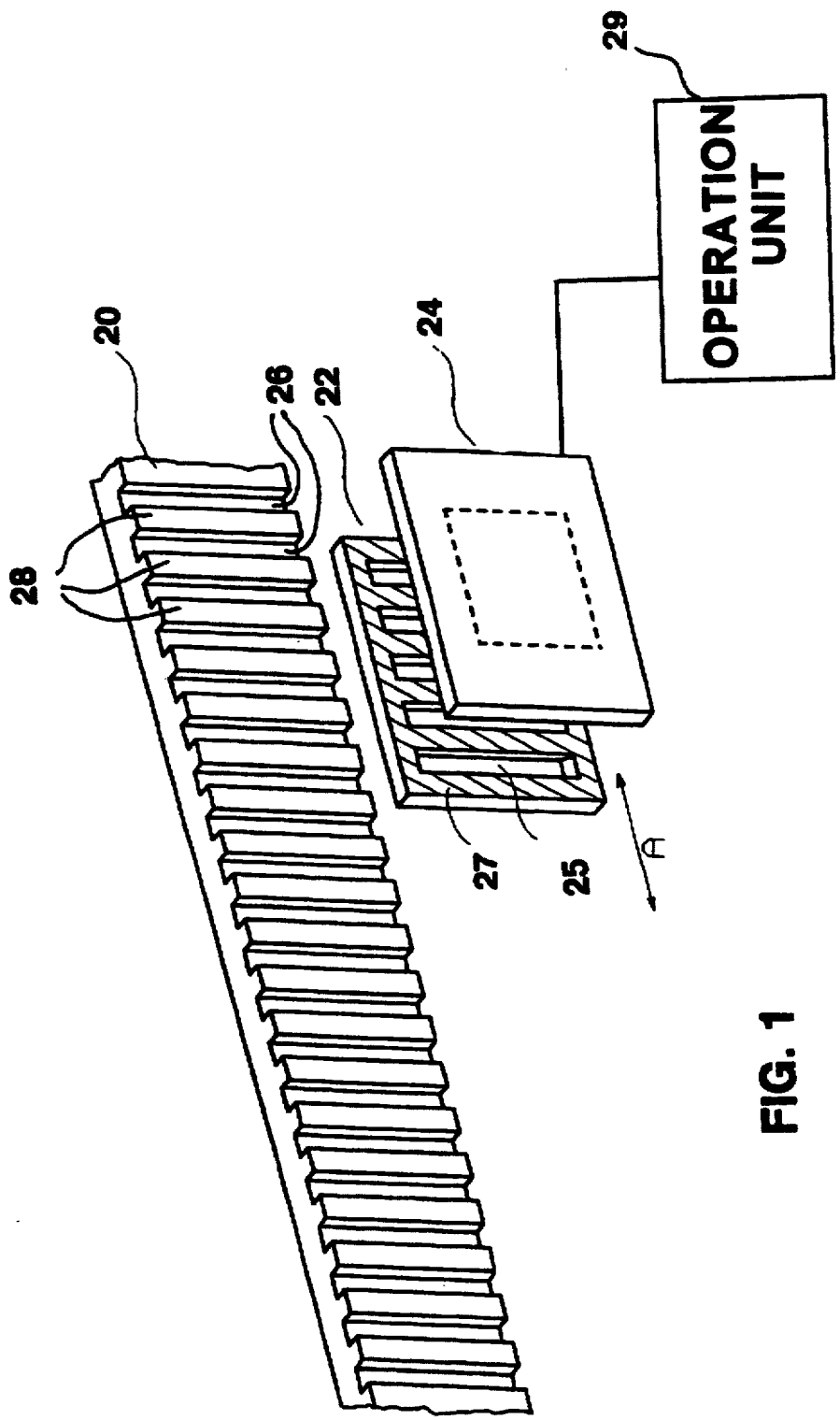
FIG. 1 is a top right front perspective view of a first embodiment of an optical encoder constructed according to principles of this invention.
Figure 2A:
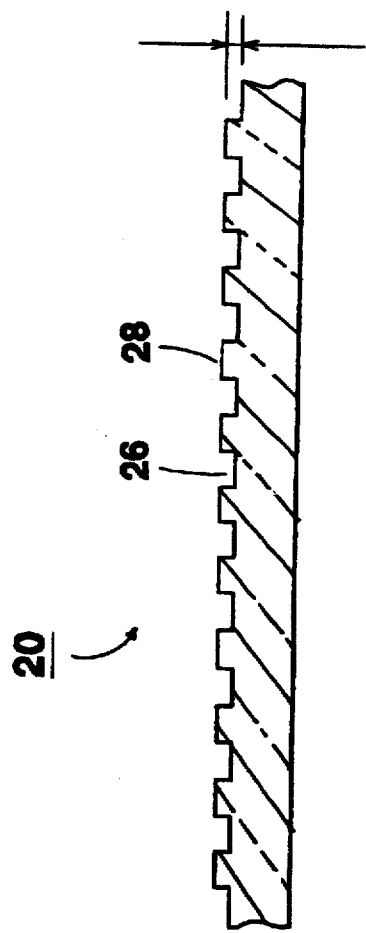
FIG. 2A is a transverse cross-sectional detail view of an example of a diffraction grating in the first embodiment.

FIG. 1 is an oblique structural view of an encoder of a first embodiment of this invention. The encoder of this embodiment includes a first diffraction grating 20 for initially receiving light from a light source, a second diffraction grating 22, which moves in relative displacement along the direction of arrow A in the figure, for receiving the light that has passed through the first diffraction grating 20, and a light receiving unit 24 for receiving the light that has further passed the second diffraction grating 22 and including a photo detector for outputting an electric signal proportional to light intensity. An operation unit 29 is connected to light receiving unit 24, and operation unit 29 computes the relative displacement of the two diffraction gratings based on the output of light receiving unit 24. The first diffraction grating 20 is a phase grating formed from a transparent material, such as polymethyl methacrylic acid (hereinafter "PMMA"), on which groove portions 26 and ridge portions 28 are alternately arranged at a predetermined pitch along the direction of relative displacement of the two diffraction gratings. FIG. 2A is a cross-sectional view of the first diffraction grating 20. As shown in this figure, the aforementioned groove portions 26 and ridge portions 28 have a thickness difference of L. This thickness difference L creates a predetermined phase difference between the light passing the groove portions 26 and the light passing the ridge portions 28 so that the zeroth-order diffracted light is not created. The setting of the thickness difference L so that the zeroth-order diffracted light is not created will be described later. The second diffraction grating 22, similar to that in the aforementioned encoder of the related art, is an amplitude modulation type of diffraction grating where transparent portions 25 and nontransparent portions 27 are alternately arranged along the direction of relative displacement of the two diffraction gratings.

Figure 2B:
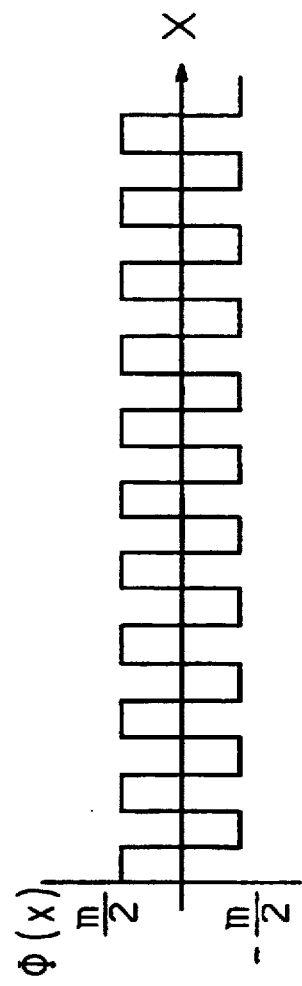
FIG. 2B is a graph illustrating a phase change in a light beam when the grating shown in FIG. 2A is used.

As described above, the first diffraction grating 20, which is a phase grating, furnishes a phase difference for the incident light beam by the thickness difference L between the groove portions 26 and ridge portions 28. If the phase difference of the light beam that passed through groove portions 26 and ridge portions 28 is m and the X coordinate is taken along the direction of the grating array of groove portions 26 and ridge portions 28, phase change $\phi(x)$ at various locations on the first grating 20 assumes a shape as shown in FIG. 2B and can be expanded into a Fourier series as given in the formula below.

$$\phi(X) = \frac{2m}{\pi} \Sigma \frac{1}{n} \times \sin(nx) \qquad (1)$$

where n is an odd number.

The transmittance t(x) of the diffraction grating can be expressed as:

$$\begin{aligned} t(x) &= \exp(j\phi(x)) \qquad (2) \\ &= \exp\left(j\frac{2m}{\pi} \Sigma \frac{1}{n} \times \sin(nx)\right) \\ &= \exp\left(j\frac{2m}{\pi} \times \sin(x)\right) \times \exp\left(j\frac{2m}{3\pi} \times \sin(3x)\right) \ldots \end{aligned}$$

When formula (2) is expressed using Bessel function $\exp(ja \times \sin b) = \Sigma [J_q(a) \exp(jq \times b)]$ (where q is $-\infty \sim \infty$):

$$t(x) = \left(\Sigma J_{q1}\left(\frac{2m}{\pi}\right) \exp(jq_1 \times x)\right) \times \qquad (3)$$
$$\left(\Sigma J_{q2}\frac{2m}{3\pi}\right) \times \exp(jq_2 \times 3x)\right) \ldots =$$
$$J_0\left(\frac{2m}{\pi}\right) \times J_0\left(\frac{2m}{3\pi}\right) \times J_0\left(\frac{2m}{5\pi}\right) \ldots +$$
$$J_1\left(\frac{2m}{\pi}\right) \exp(jx) \times J_{-3}\left(\frac{2m}{3\pi}\right) \exp(-j3x) \ldots + \ldots$$

Since the amplitude of the diffracted light is expressed as a Fourier transformation of transmittance t(x), amplitude $U_0$ of the zeroth-order diffracted light is proportional to the constant terms of t(x). Namely, $U_0$ can be expressed as:

$$U_0 \propto J_0\left(\frac{2m}{\pi}\right) \times J_0\left(\frac{2m}{3\pi}\right) \times J_0\left(\frac{2m}{5\pi}\right) \ldots \qquad (4)$$

since the first constant term dominates with respect to the other constant terms, in the case where the first term is 0, that is:

$$J_0\left(\frac{2m}{\pi}\right) = 0 \quad (5)$$

$U_0$ becomes 0 and the zeroth-order diffracted light is removed. The first root satisfying formula (5) is 2.40. Therefore, the phase difference m in this case is given in the following formula:

$$m = 2.4 \times \frac{\pi}{2} = 3.77 (\text{rad}) \quad (6)$$

If the refractive index of the material, such as PMMA, is $\eta$, and the refractive index of air is $\eta_0$, the phase delay $\phi_r$ from passing through the material, the phase delay $\phi_a$ from passing through air, and the phase difference m are given in the following formulas:

$$\phi r = \frac{\eta L \times 2\pi}{\lambda_0} \quad (7)$$

$$\phi a = \frac{L \times 2\pi}{\lambda_0}$$

Phase difference m=$\phi$r−$\phi$a where $\lambda_0$ is the wavelength of the passing light. Thickness L can thus be obtained from the following formula:

$$L = \frac{m\lambda_0}{2\pi(\eta - 1)} \quad (8)$$

For example, in the case of a PMMA phase grating, the refractive index is 1.492. If a light source of wavelength 0.83 μm is used and thickness L is 1.07 μm, the zeroth-order diffracted light is not created. In other words, the zeroth-order diffracted light component is not created in the region between the first diffraction grating 20 and the second diffraction grating 22. Therefore, the light beam passing the second diffraction grating 22 is a diffracted light component of order ±1 or greater that does not include the zeroth-order. Although the first solution of the Bessel function was used in the aforementioned example, the second or subsequent solution may be used. Furthermore, phase difference m may be set to $\pi$(2N+1) so that the respective phases of light that has passed groove portions 26 and ridge portions 28 are inverted and cancel each other (where N is a natural number). In the related art example, when the grating pitch periodic component due to interference of the zeroth-order diffracted light and the first-order diffracted light in the first diffraction grating is the fundamental wave component, and the gap between the first diffraction grating and second diffraction grating changes, the amounts of change differ in the optical path lengths of the zeroth-order diffracted light and the first-order diffracted light in the first diffraction grating, thus resulting in a problem where the interference of the zeroth-order diffracted light and first-order diffracted light changes and the fundamental wave component changes. In comparison, the zeroth-order diffracted light component is not included in this embodiment and there is no interference between the zeroth-order diffracted light and the first-order diffracted light. Therefore, there is no fundamental wave component having the grating pitch as the fundamental period, and the half grating pitch periodic component due to interference of the light of order ±1 becomes the fundamental wave component. The light of order ±1 is not affected by changes in the gap between gratings since it is the result of interference among components having equal optical path lengths. Therefore, an optical encoder can be implemented where the fundamental wave component of the displacement signal does not change even if the gap between gratings changes.

Figure 3:
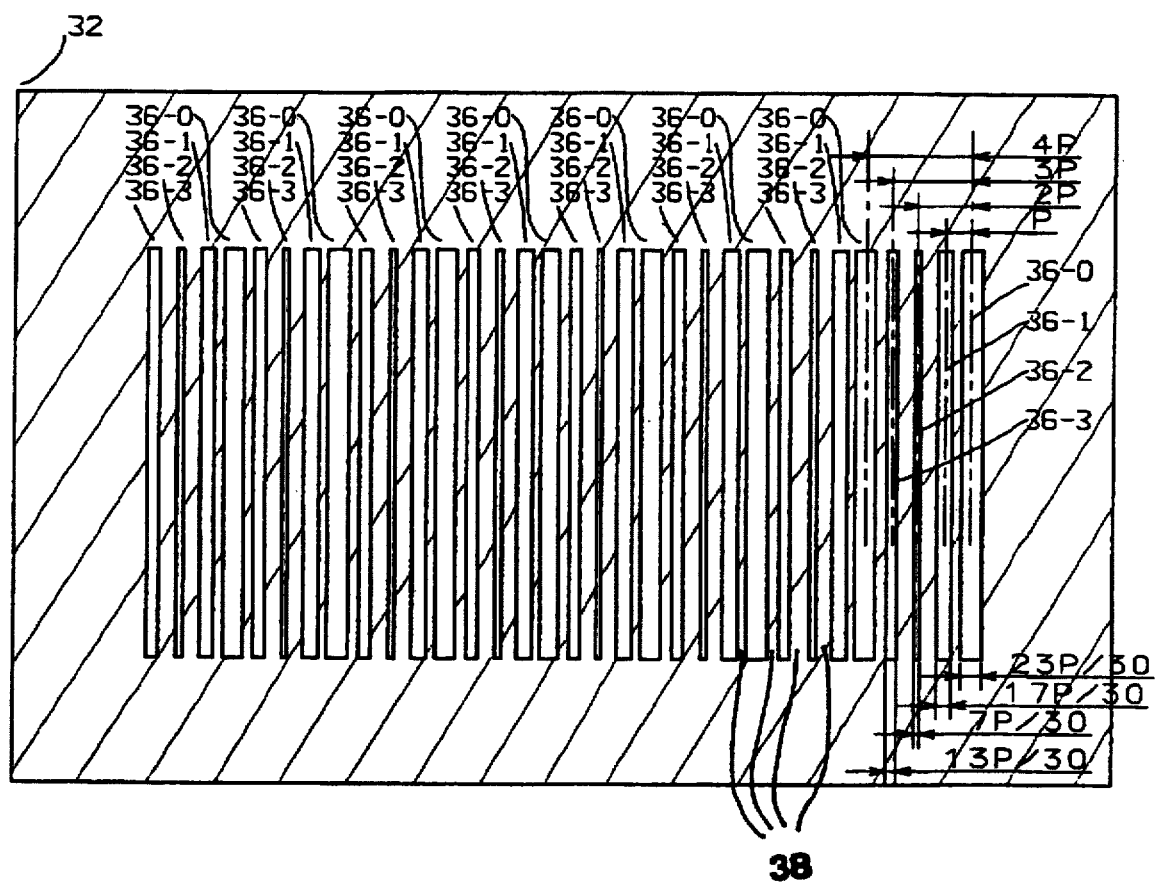
FIG. 3 is a side elevational view of an example of a diffraction grating in a second embodiment of the optical encoder related to this invention.

A second embodiment will be described next in accordance with FIG. 3. The optical encoder of this embodiment replaces the second diffraction grating 22 of the first embodiment with a second diffraction grating 32. The second diffraction grating 32 has transparent portions 36 and non-transparent portions 38 alternately arranged, and there are four widths for transparent portions 36 arranged periodically. The pitch of the center lines of the transparent portions 36 (hereinafter "array pitch") is constant. Regarding the widths of the transparent portions 36, transparent portion 36-0 is 23P/30, transparent portion 36-1 is 17P/30, transparent portion 36-2 is 7P/30, and transparent portion 36-3 is 13P/30, where P is the array pitch. The transmittance distribution for transparent portions 36 does not include third- and fifth-order distortion components. Furthermore, since the overall ratio of the transparent portions to the nontransparent portions is 1:1, the transmittance distribution of the grating also does not include the even-order components.

The pattern widths are determined by the approach below.

Using 2w for the width of transparent portions 36 of the second diffraction grating (hereinafter "grating width"), the third- and fifth-order distortion of the grating pattern are expressed in formulas (9) and (10) below.

The third-order distortion is derived from the following:

$$\frac{2}{\pi} \times \frac{1}{3} \times \sin\left(\frac{2\pi \times 3w}{P}\right) \times \cos(3x) \quad (9)$$

The fifth-order distortion is derived from the following:

$$\frac{2}{\pi} \times \frac{1}{5} \times \sin\left(\frac{2\pi \times 5w}{P}\right) \times \cos(5x) = \quad (10)$$

$$-\frac{2}{\pi} \times \frac{1}{5} \times \sin\left[\left(\frac{2\pi \times 5w}{P}\right) + \pi(1 + 2n\_)\right] \times \cos(5x)$$

Furthermore, if the sum of the distortion components by the grating having a grating width of 2w and the distortion components by the grating having a grating width of 2w' is 0, the distortion components can be removed, the conditions of which are expressed in the formulas below:

$$\sin\left(\frac{2\pi \times 3w}{P}\right) + \sin\left(\frac{2\pi \times 3w'}{P} + 2\pi n'\right) = 0 \quad (11)$$

$$\sin\left(\frac{2\pi \times 5w}{P}\right) - \sin\left\{\frac{2\pi \times 5w'}{P} + \pi(1 + 2n'')\right\} = 0 \quad (12)$$

where n' and n" are integers.

The two grating widths W=2w and W'=2w' can now be obtained from the formulas below:

$$W = 2w = P\left(\frac{n}{3} + \frac{1 + 2n'}{10}\right) \quad (13)$$

$$W' = 2w' = P\left(\frac{n}{3} - \frac{1 + 2n'}{10}\right) \quad (14)$$

From these formulas, the values below that are smaller than grating pitch P exist as solutions for grating widths 2w and 2w':

(W,W')=(23P/30, 17P/30), (7P/30, 13P/30), (19P/30, P/30), (29P/30, 11P/30)

Solutions 23P/30, 17P/30 and 13P/30, 7P/30 are selected from the above.

Although it may be sufficient to select only 23P/30, 17P/30, for example, for the grating widths, by additionally including 13P/30, 7P/30, the overall ratio of the transparent portions to the nontransparent portions becomes 1:1 and the transmittance distribution will not include even-order components.

Generalizing the above formulas (13) and (14), the grating pattern widths can be expressed in the formulas below to remove the ath- and bth-order distortion components:

$$W = P\left(\frac{n}{a} + \frac{1+2n'}{2b}\right) \quad (15)$$

$$W' = P\left(\frac{n}{a} - \frac{1+2n'}{2b}\right) \quad (16)$$

From the above relational expressions, a configuration using gratings having two types of grating widths enables the removal of any two distortion components. Although the values of grating widths W and W' can become infinity if n and n' are changed, values that are feasible for a practical grating pattern should be used.

In an optical encoder having this sort of configuration, among the diffracted light that has passed the two gratings, an amplitude A of the zeroth-order diffracted light is expressed in the formula below:

$$|A| = \Sigma\left[{}_1C_{-k}\,{}_2C_k \exp\left\{jnk\left(\frac{2d}{P} - Mk\right)\right\}\right] \quad (17)$$

where:

${}_1C_{-k}$ is a Fourier coefficient of the transmittance of the first diffraction grating;

${}_2C_k$ is a Fourier coefficient of the transmittance of the second diffraction grating;

d is the amount of relative displacement of the two diffraction gratings;

M is $\lambda Z/P2$;

$\lambda$ is the wavelength of the light beam; and

Z is the gap between the diffraction gratings.

The second diffraction grating 32 does not include the third- and fifth-order distortion components in the transmittance distribution. Therefore, light amplitude A is 0 when k in the formula above corresponding to the third- and fifth-order is 3 or 5. In other words, the third- and fifth-order distortion components are not included in the change in light amplitude A when the two diffraction gratings are moved at a uniform speed. Since the light intensity obtained at the photo detector is expressed as a complex conjugate of the light amplitude, the light intensity also does not include the third- and fifth-order distortion components.

As shown in the first embodiment, since the zeroth-order diffracted light is not created due to the difference in thickness of the phase grating of the first diffraction grating, the fundamental wave component does not change with the gap between gratings. Furthermore, since two brightness changes occur from a relative displacement of one pitch of the diffraction gratings due to interference among first-order diffracted light, a signal having a ½ pitch period is formed which becomes the fundamental period. Therefore, in the optical encoder of this embodiment, a sine wave displacement signal that does not include the third- and fifth-order distortion components can always be obtained independently of the gap between gratings, and without fluctuation of the fundamental wave component. Furthermore, a distortion-free sine wave displacement signal can be obtained with respect to a detailed periodic signal having a ½ pitch period.

Figure 4:
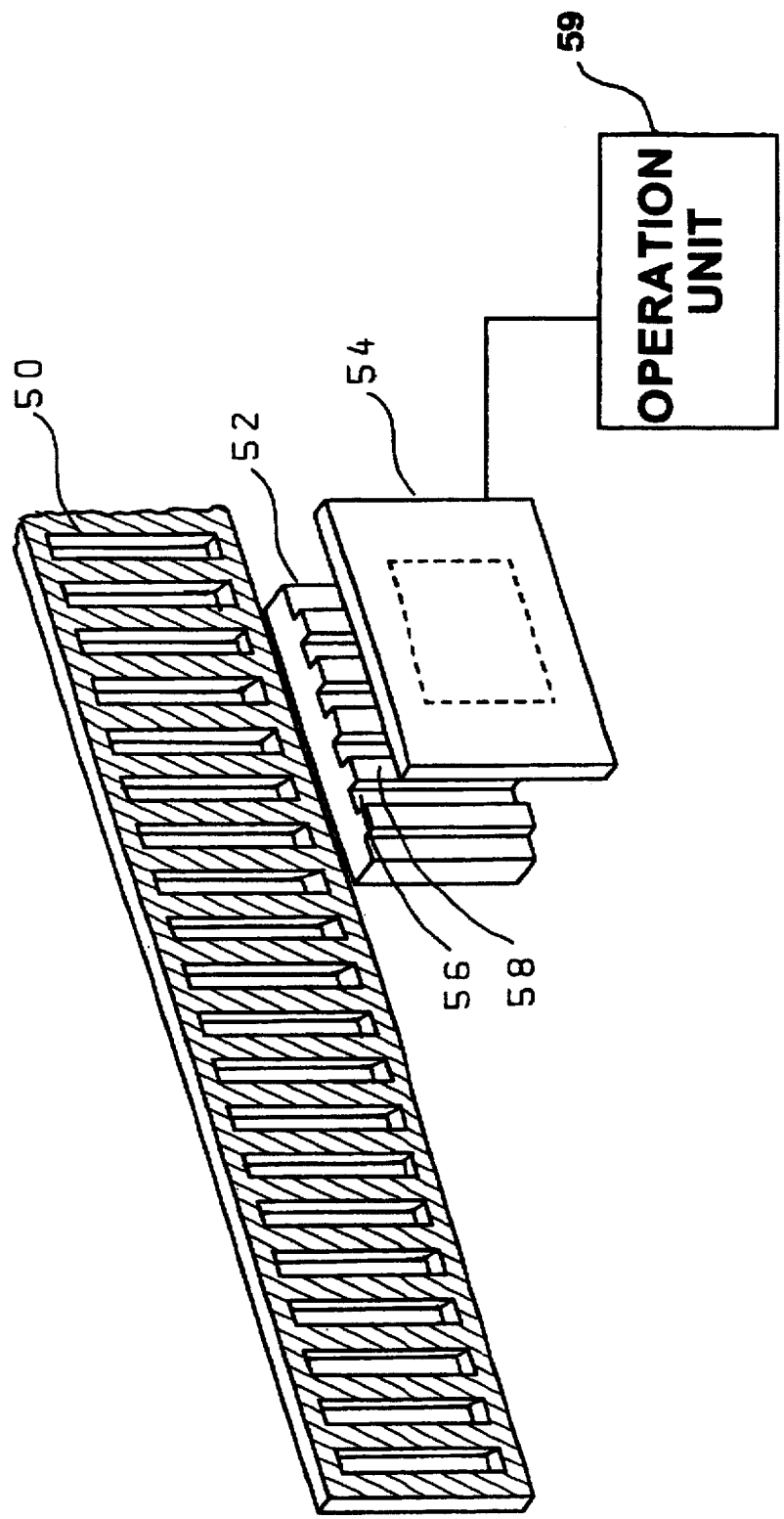
FIG. 4 is a top right front perspective view of a third embodiment of an optical encoder constructed according to principles of this invention.

A third embodiment is described next in accordance with FIG. 4.

In this embodiment, a first diffraction grating 50 is an amplitude modulation type of diffraction grating, and a second diffraction grating 52 is a phase grating. Furthermore, as in the first embodiment, a photo detector for a light receiving unit 54, and an operation unit 59 for calculating the amount of relative displacement of the two diffraction gratings based on the output signal of the photo detector are provided. In this embodiment, the difference in thickness of the groove and ridge of the grating is set so that the zeroth-order diffracted light is not created in the phase grating. At the second diffraction grating 52, a diffraction of order ±1 or greater that does not include the zeroth-order occurs. At photo detector 54, the zeroth-order diffracted light is received after diffraction twice through the two diffraction gratings (called "double diffraction"). The zeroth-order diffracted light in the first diffraction grating cannot proceed through the second grating as the zeroth-order component of the second. The dominant component here is the zeroth-order diffracted light after the double diffraction of the diffraction of order ±1 in the first diffraction grating, and further the diffraction of order ±1 in the second diffraction grating. This component forms the fundamental wave component. The light of order ±1 is not affected by changes in the gap between gratings since it is the result of interference among components having equal optical path lengths. Therefore, the fundamental wave component of the displacement signal does not change even if the gap between gratings changes. Furthermore, the interference of order ±1 creates two periods of brightness for a displacement of grating pitch P so that the fundamental period is P/2. In comparison, the diffracted light components of order 2 and greater in the first diffraction grating are also included as high-order components in the zeroth-order diffracted light after double diffraction in the same manner.

Figure 5A:
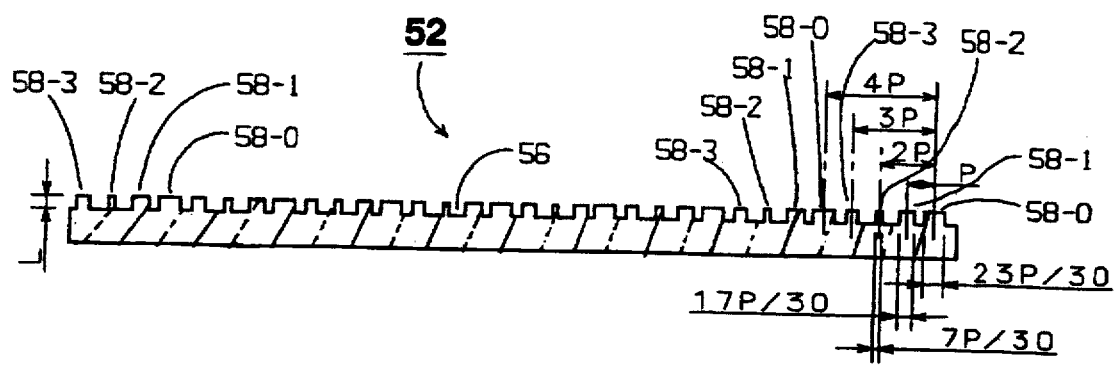
FIG. 5A is a transverse cross-sectional detail view of an example of a diffraction grating in the third embodiment.
Figure 5B:
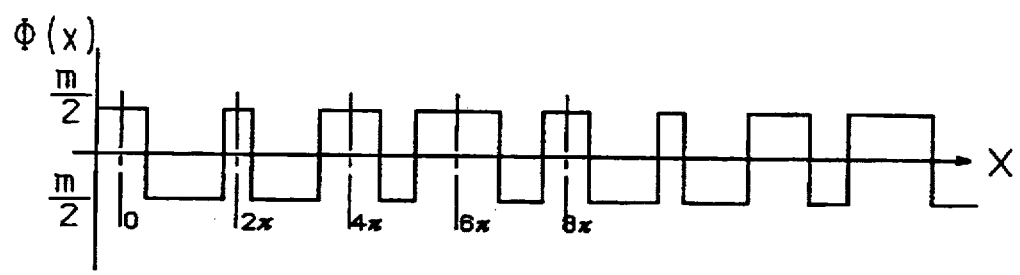
FIG. 5B is a graph illustrating a phase change in a light beam when the grating shown in FIG. 5A is used.

The embodiment of the phase grating used in the second diffraction grating 52 is described in accordance with FIGS. 5A and 5B.

The phase grating 52, of which a cross-sectional view is shown in FIG. 5A, not only has a thickness difference L to eliminate the zeroth-order diffracted light but a high and low pattern formed by grooves 56 and ridges 58 that is modulated.

Although the groove and ridge pattern has a period P for the spacing between the centers of ridges 58, the widths are not P/2 and not uniform. As shown in FIG. 5A, the widths of ridges 58 are repeatedly arranged in a sequence where ridge 58-0 is 17P/30, ridge 58-1 is 23P/30, ridge 58-2 is 7P/30, and ridge 58-3 is 13P/30. The widths of ridges 58-0 to 58-3 are identical to the widths of transparent portions 36-0 to 36-3 of the second embodiment. Phase change $\phi(x)$ of the incident light beam for a phase grating having this sort of groove-ridge pattern is shown in FIG. 5B. As in the description for the second embodiment, the rectangular pattern of phase change $\phi(x)$ does not include the third- and fifth-order harmonic components. Transmittance t(x) of the phase grating is expressed by $\exp(j\phi(x))$ and this transmittance t(x) also does not include the third- and fifth-order harmonic components. Therefore, the light intensity obtained at the photo detector does not include the third- and fifth-order distortion components.

Since, as described above, the zeroth-order diffracted light is not created by the thickness difference of the phase grating in the second diffraction grating 52, the fundamental wave component does not change with the gap between gratings. Therefore, in the optical encoder of this embodiment, a sine wave displacement signal that does not include the third- and fifth-order distortion components can always be obtained independently of the gap between gratings, and without fluctuation of the fundamental wave component.

An advantage of this embodiment compared to the previously described embodiment is that the cost can be reduced. At the current level of industrial technology, it is easier to fabricate an amplitude modulation type of diffraction grating than a phase grating. Furthermore, the first diffraction grating 50 is generally much longer than the second diffraction grating 52. Therefore, a configuration using an amplitude modulation type of diffraction grating for the first diffraction grating is advantageous in terms of cost.

Figure 6A:
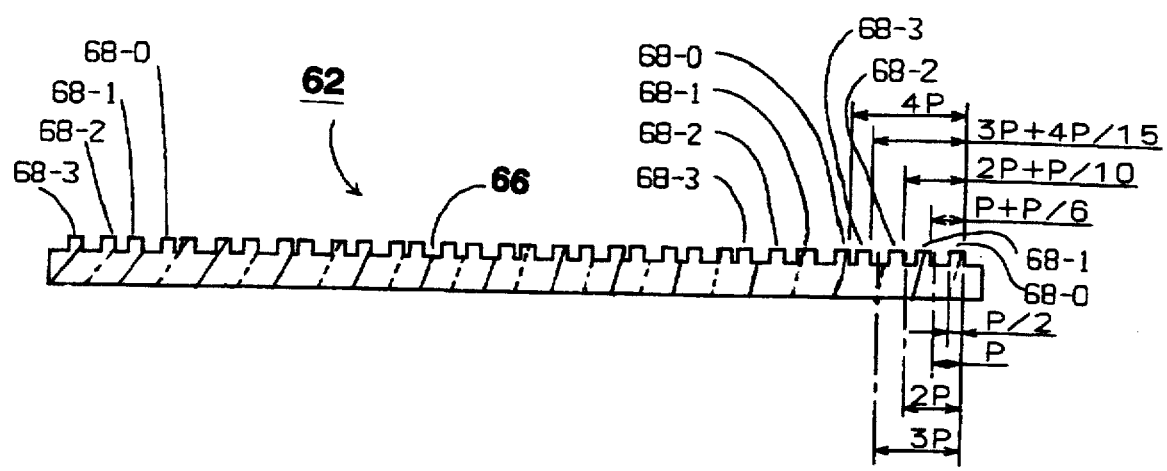
FIG. 6A is a transverse cross-sectional detail view of another example of a diffraction grating in the third embodiment.
Figure 6B:
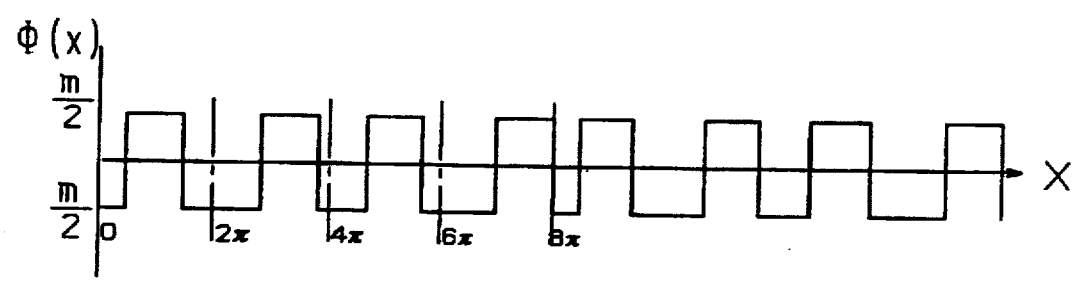
FIG. 6B is a graph illustrating a phase change in a light beam when the grating shown in FIG. 6A is used.

An example of a second diffraction grating to replace the second diffraction grating 52 previously described is shown in FIGS. 6A and 6B. A second diffraction grating 62 in this example is a phase grating, where thickness difference L has a value for removing the zeroth-order diffracted light and further the period at which ridges 68 are arranged is modulated. In FIG. 6A, ridges 68 are assigned symbols 68-0, 68-1, 68-2, and 68-3. The illustrated ridges 68 are shifted, with respect to positions at an integral multiple of P from ridges 68-0, by P/6 for ridges 68-1, P/10 for ridges 68-2, and 4P/15 for ridges 68-3. The widths of ridges 68 are P/2. Phase change $\phi(x)$ of the incident light beam for phase grating having this sort of ridge pattern is shown in FIG. 6B. The rectangular pattern of phase change $\phi(x)$ does not include the third- and fifth-order harmonic components. In order to eliminate these harmonic components, the positional relationship of the ridges is shifted as described above. The amount of positional shift provided in the positional relationship of ridges 68-0 and ridges 68-1 is P/6 so that the third-order Fourier component of the amount of mutual phase change is canceled in the phase change shown in FIG. 6B. The third-order Fourier component is a P/3 periodic component so that the third-order Fourier component is canceled by the addition of an inverted P/3 periodic component. Thus, a positional shift of $P/(2 \cdot 3) = P/6$ is provided. Similarly, a positional shift of P/6 is provided for ridges 68-2 and ridges 68-3 so that the mutual third-order Fourier components are canceled. Furthermore, a positional shift of $P/(2 \cdot 5) = P/10$ is provided in ridges 68 so that the phase change of ridge pairs 68-2 and 68-3 with respect to the phase change of ridge pairs 68-0 and 68-1 cancels the fifth-order Fourier component. As a result, a positional shift of P/6 is provided for ridges 68-1, P/10 for ridges 68-2, and $P/6 + P/10 = 4P/15$ for ridges 68-3 in order to cancel the third- and fifth-order Fourier components. Depending on the direction of shift, a minus symbol may be assigned to the amount of shift. For example, the amounts of shift for ridges 68-1 to 68-3 may be denoted as $-P/6$, $P/10$, and $-P/6+P/10=P/15$.

Similarly, to remove the ath- and bth-order periodic components, positional shifts of $P/(2 \cdot a)$ and $P/(2 \cdot b)$ as well as a sum of this combination, $P/(2 \cdot a)+P/(2 \cdot b)$, are provided.

Transmittance t(x) of the phase grating is expressed by $\exp(j\phi(x))$ and this transmittance t(x) also does not include the third- and fifth-order harmonic components. Accordingly, the light intensity obtained at the photo detector does not include the third- and fifth-order distortion components. Therefore, in the optical encoder of this embodiment, a sine wave displacement signal that does not include the third- and fifth-order distortion components can always be obtained independently of the gap between gratings, and without fluctuation of the fundamental wave component.

Figure 7A:
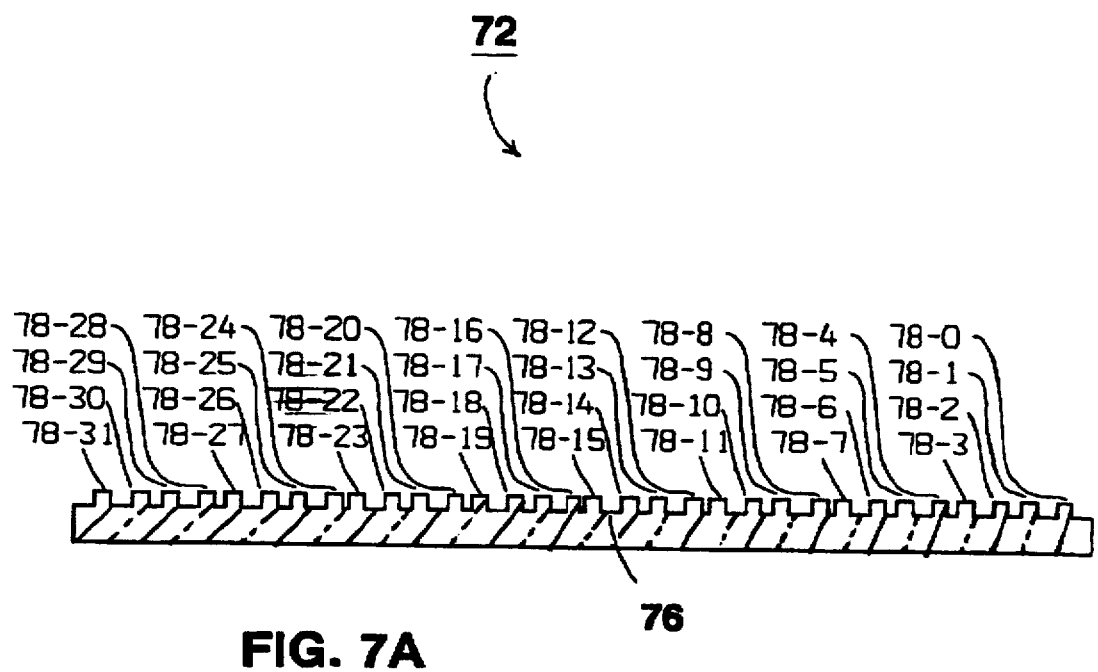
FIG. 7A is a transverse cross-sectional detail view of yet another example of a diffraction grating in the third embodiment.

An example of another second diffraction grating to replace the second diffraction grating 52 previously described is shown in FIGS. 7A. A second diffraction grating 72 in this example is a phase grating, where thickness difference L has a value for removing the zeroth-order diffracted light and further the period at which ridges 78 are arranged is modulated, the modulation resulting in a phase change $\phi(x)$ that does not include Fourier components of up to the thirteenth order, and also in a transmittance t(x) that does not include Fourier components of up to the thirteenth order. In FIG. 7A, ridges 78 are assigned symbols 78-0, 78-1, 78-2, 78-3, . . . , 78-32. Ridges 78-0 and 78-1 are provided with positional shifts of P/6 so that the mutual third-order Fourier components are canceled in the phase change. This similarly applies to ridges 78-2 and 78-3. Furthermore, ridge pair 78-2 and 78-3 is provided with a positional shift of P/10 with respect to ridge pair 78-0 and 78-1 so that the fifth-order Fourier component of the phase change $\phi(x)$ cancels. Their positional shifts, similar to the example of FIG. 6A previously described, are $P/(2 \cdot 3)$ and $P/(2 \cdot 5)$ as well as a sum of this combination, $P/(2 \cdot 3)+P/(2 \cdot 5)$.

Furthermore, a positional shift of P/14 is provided in ridges 78 so that the phase change of ridge set 78-4 to 78-7 with respect to ridge set 78-0 to 78-3 cancels the seventh-order Fourier component. In other words, the positional shifts are 0, $P/(2 \cdot 3)$, $P/(2 \cdot 5)$, and $P/(2 \cdot 3)+P/(2 \cdot 5)$, and to which positional shifts in ridges of P/14 are added, P/14, $P/(2 \cdot 3)+P/14$, $P/(2 \cdot 5)+P/14$, $P/(2 \cdot 3)+P/(2 \cdot 5)+P/14$. These values are expressed as combinations of $P/(2 \cdot 3)$, $P/(2 \cdot 5)$, and $P/(2 \cdot 7)$.

Similarly, ridge set 78-8 to 78-15 is provided with a positional shift of P/22 to the ridges with respect to ridge set 78-0 to 78-7, and ridge set 78-16 to 78-31 is provided with a positional shift of P/26 with respect to ridge set 78-0 to 78-15 so that the eleventh- and thirteenth-order Fourier components are canceled in the phase changes. These positional shifts are expressed as combinations of $P/(2 \cdot 3)$, $P/(2 \cdot 5)$, $P/(2 \cdot 7)$, $P/(2 \cdot 11)$, and $P/(2 \cdot 13)$. As a result, Fourier components of up to the thirteenth order are not found in phase change $\phi(x)$ in ridges 78-0 to 78-31.

Although the third- and fifth-order distortion components are not included in the displacement signal when the second diffraction gratings shown in FIGS. 5A and 6A are used, high-order distortion Fourier components, such as of the seventh- and eleventh-order, are included. In comparison, by using the second diffraction grating shown in FIG. 7A, an essentially pure sine wave displacement signal that does not include high-order distortion components of up to the thirteenth order can always be obtained independently of the gap between gratings, and without fluctuation of the fundamental wave component.

In this pattern, positional shifts corresponding to $P/(2 \cdot 3)$, $P/(2 \cdot 5)$, $P/(2 \cdot 7)$, $P/(2 \cdot 11)$, and $P/(2 \cdot 13)$, as well as sums of these combinations are provided in order to eliminate periodic components of the third-, fifth-, seventh-, eleventh- and thirteenth-order in the displacement signal. Similarly, positional shifts corresponding to $P/(2 \cdot a)$, $P/(2 \cdot b)$, $P/(2 \cdot c)$, and $P/(\cdot d)$, as well as sums of these combinations may be provided in order to eliminate periodic components of the ath-, bth-, cth-, and dth-order.

The arrangement, such as the left to right sequence, is not limited to the one given herein as long as these combinations are included.

Figure 7B:
FIG. 7B is a transverse cross-sectional detail view of yet another example of a diffraction grating in the third embodiment.

It is desirable to design the gap between patterns so as to be nearly uniform. An example of a further modification of this invention is shown in FIG. 7B. In this example, to keep the pattern gap nearly uniform, a pattern having small positional shifts is arranged adjacently from the right end and a pattern having large positional shifts is arranged in proportion to the distance toward the left end. Also, in the phase grating, a displacement signal similar to that for FIG. 7A is obtained, the advantage of this configuration being easy fabrication. The reason is that in contrast to the extremely narrow grooves in FIG. 7A requiring detailed machining precision depending on their positions, the groove- ridge pattern in the phase grating in FIG. 7B can be formed at a nearly uniform pitch. The period for this pattern is, in precise terms, one period for 32 ridges. However, the overall arrangement may comprise one period or two or more periods.

In this simple double-diffraction configuration, an essentially pure sine wave can always be obtained without separating the diffracted light, independently of the gap between gratings, and without fluctuation of the fundamental wave component.

Figure 8:
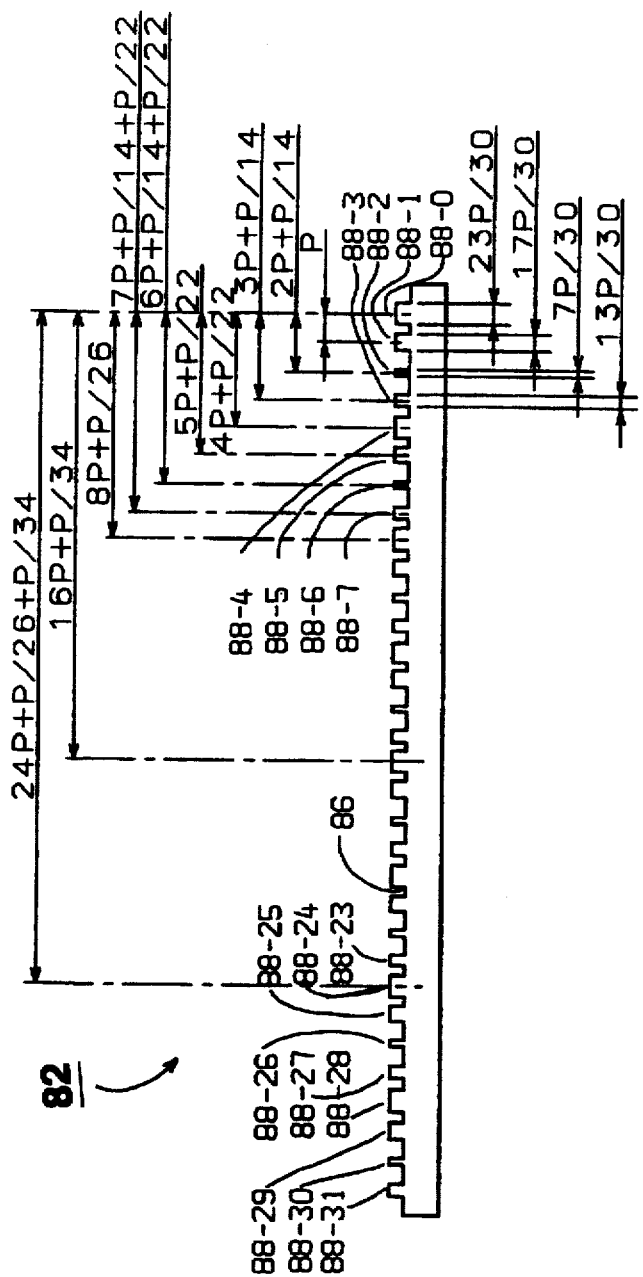
FIG. 8 is a transverse cross-sectional detail view of yet another example of a diffraction grating in the third embodiment.

Yet another example to replace the second diffraction grating 52 is shown in FIG. 8. A second diffraction grating 82 in this example is a phase grating, where thickness difference L has a value for removing the zeroth-order diffracted light and further the period and width of the ridges are modulated, the modulation resulting in a phase change $\phi(x)$ that does not include Fourier components of up to the seventeenth order, and also in a transmittance t(x) that does not include Fourier components of up to the seventeenth order. In FIG. 8, ridges 88 are assigned symbols 88-0, 88-1, 88-2, 88-3, ... , 88-31. The widths of ridges 88-0 and 88-1 among ridges 88 are 23P/30 and 17P/30 and the widths of ridges 88-2 and 88-3 are 7P/30 and 13P/30 so that the mutual third- and fifth-order Fourier components are canceled in the phase change. This similarly applies to ridges 88-2 and 88-3. Furthermore, a positional shift of P/14 is provided in ridges 88 so that the phase change of ridge pair 88-2 and 88-3 with respect to ridge pair 88-0 and 88-1 cancels the 7th-order Fourier component. Additionally, a positional shift of P/22 is provided for ridges 88 so that the phase change of ridge set 88-4 to 88-7 with respect to ridge set 88-0 to 88-3 cancels the eleventh-order Fourier component. Also, a positional shift of P/26 for ridge set 88-8 to 88-15 with respect to ridge set 88-0 to 88-7, and a positional shift of P/34 for ridge set 88-16 to 88-31 with respect to ridge set 88-0 to 88-15 are provided in ridges 88 so that the thirteenth- and seventeenth-order Fourier components in the phase change are canceled. As a result, Fourier components of up to the seventeenth order are not found in phase change $\phi(x)$ in ridges 88-0 in 88-31. An advantage of the second diffraction grating 82 according to this embodiment is that the high-order Fourier components of up to the seventeenth order are not found due to the same 32 groove-ridge pattern in FIG. 7A. By using the second diffraction grating 82 shown in FIG. 8, an essentially pure sine wave displacement signal that does not include high-order distortion components of up to the seventeenth order can always be obtained independently of the gap between gratings, and without fluctuation of the fundamental wave component.

Figure 9:
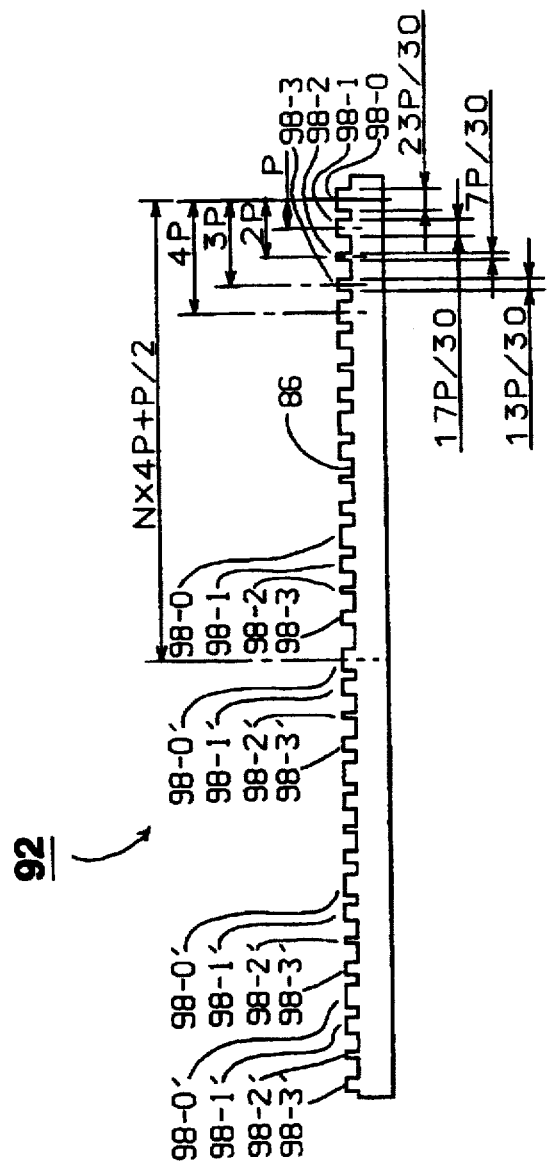
FIG. 9 is a transverse cross-sectional detail view of an example of a grating unit in a fourth embodiment of the optical encoder related to this invention.

A fourth embodiment is described next in accordance with FIG. 9. In the embodiment mentioned previously, the fundamental wave component of the displacement signal is ½ the grating pitch.

However, in an optical encoder having this sort of configuration, the zeroth-order diffracted light component is not completely eliminated and partly remains if there is an error in thickness difference L. Thus, the grating pitch periodic component, although extremely small compared to the optical encoder of the related art, is created in the displacement signal. This component varies with a change in the gap between gratings. This embodiment removes the aforementioned error. This embodiment uses a second diffraction grating 92 to replace the aforementioned second diffraction grating 52. With this pattern, the grating pitch periodic component created by the error in thickness L is eliminated together with the third- and fifth-order distortion components. Ridges 98-0, 98-1, 98-2, and 98-3 are identical to those in the embodiment shown in FIG. 6A, and the pattern of phase change $\phi(x)$ does not include harmonic components of the third and fifth order. Ridges 98-0 and 98-1 are provided with a positional shift of P/6 so that the mutual third-order Fourier components are canceled in the phase change. This similarly applies to ridges 98-2 and 98-3. Furthermore, a positional shift of P/10 is provided in the ridges so that the phase change of ridge pairs 98-2 and 98-3 with respect to ridge pairs 98-0 and 98-1 cancels the fifth-order Fourier component. The transmittance t(x) of the phase grating of the portion configured by ridges 98-0, 98-1, 98-2, and 98-3 does not include the third- and fifth-order harmonic components, and the light intensity obtained at the photo detector does not include the third- and fifth-order distortion components. However, if there is an error in thickness L, the displacement signal includes the grating pitch periodic component. For this displacement signal, the light beam that has passed the phase grating of the portion configured by ridges 98-0', 98-1', 98-2', and 98-3' has a phase difference of P/2 in the light intensity obtained at the photo detector with respect to the light beam that has passed ridges 98-0, 98-1, 98-2, and 98-3. Therefore, by receiving these light beams together, the grating pitch P periodic component is canceled and not included in the displacement signal. The fundamental wave components of period P/2 are in phase and add to increase in magnitude.

Photo detector 54 may be located at a distance from the second diffraction grating to receive light in the Fraunhofer region. However, in this case, the diffracted light may be separated and concentrated with a Fourier transformation lens. Furthermore, photo detector 54 may be located immediately after the second diffraction grating.

The optical arrangement is not limited to this example, and the arrangement of the first diffraction grating which is long and the second diffraction grating which is short in the longitudinal direction may be reversed.

Figure 10:
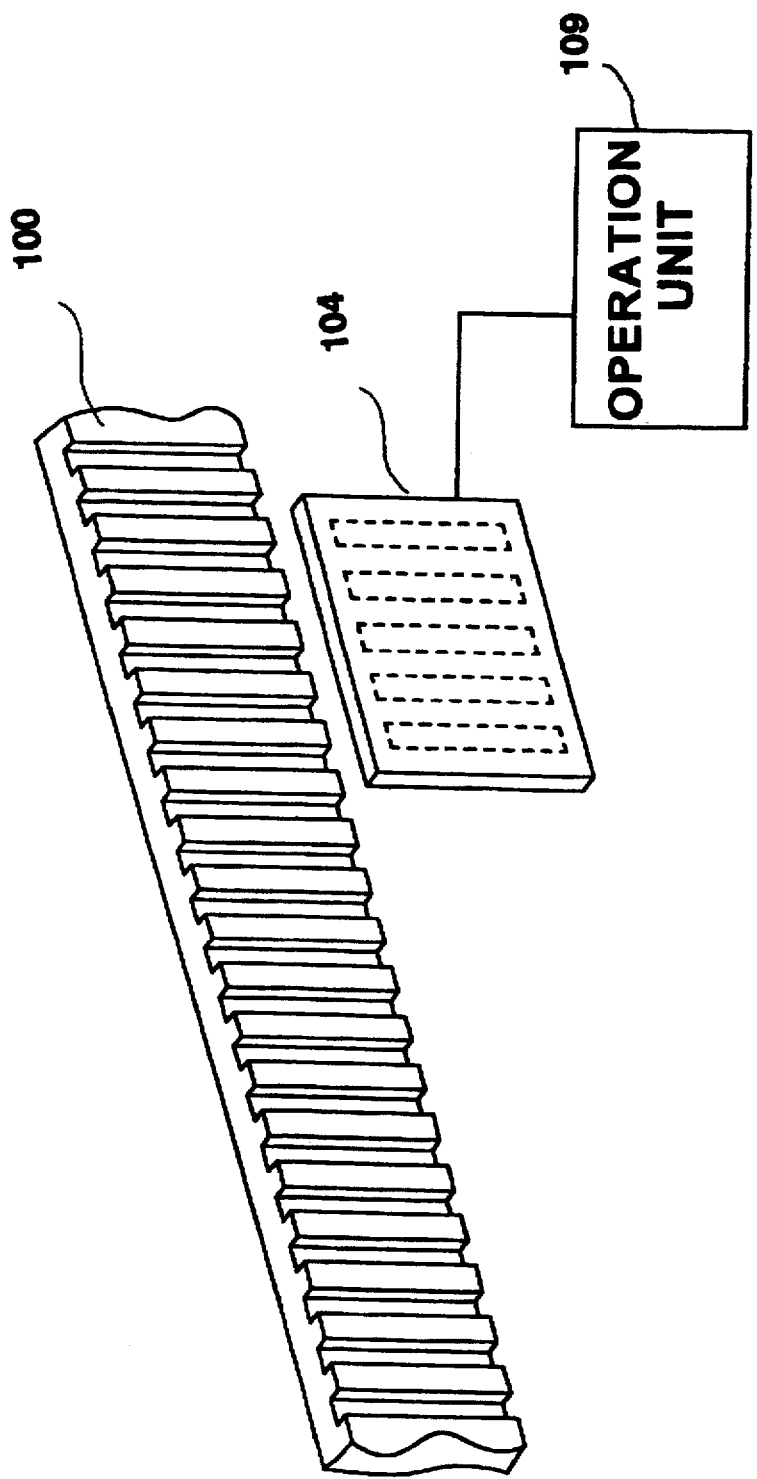
FIG. 10 is a top right front perspective view of a fifth embodiment of an optical encoder constructed according to principles of this invention.
Figure 11:
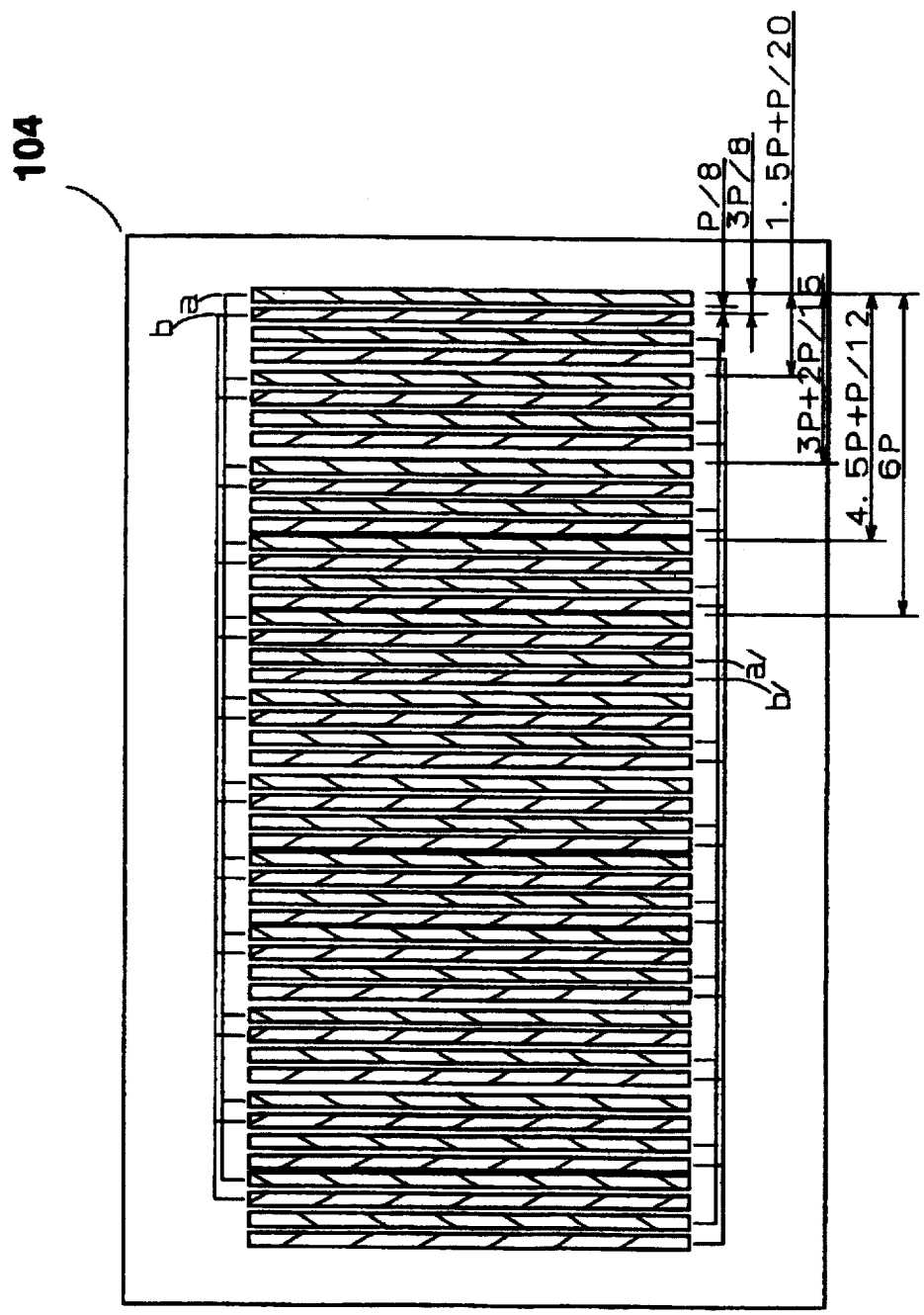
FIG. 11 is a side elevational view of an example of a photo detector unit in the fifth embodiment of the optical encoder related to this invention.
Figure 12:
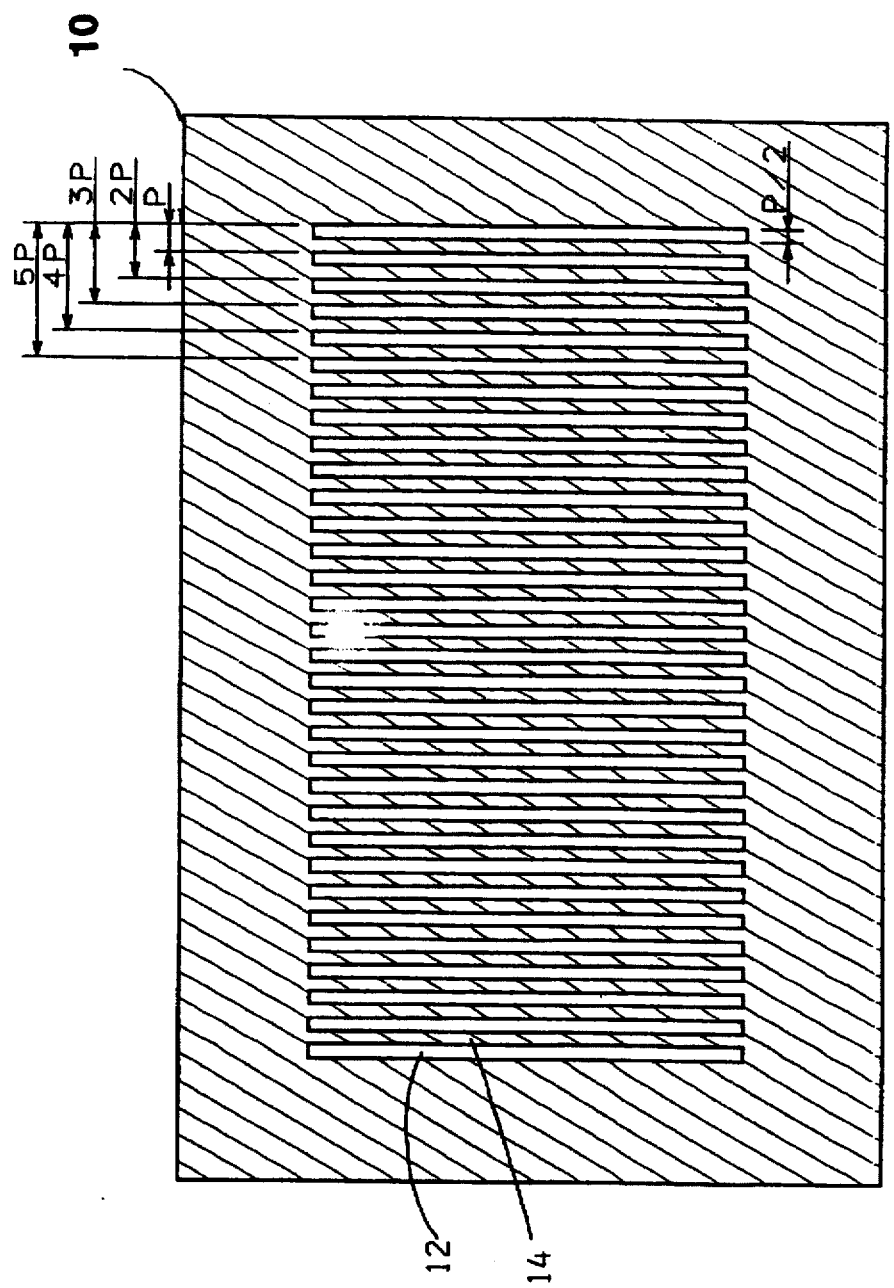
FIG. 12 is a side elevational view of an example of a grating unit in an optical encoder of the prior art.
Figure 13:
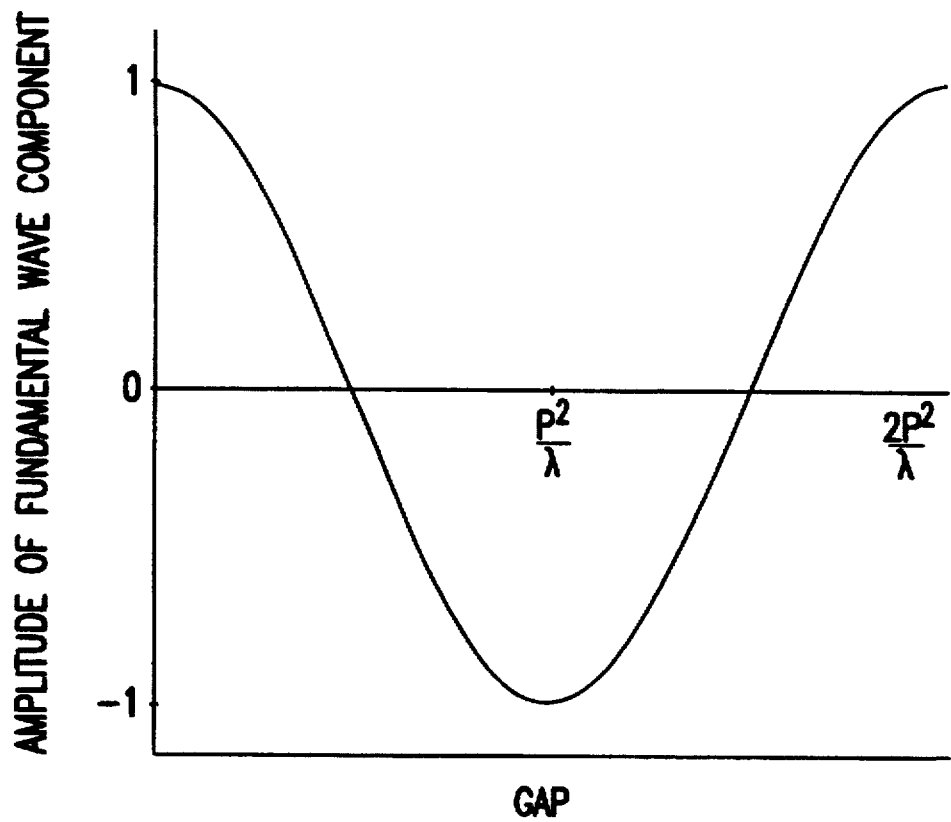
FIG. 13 is a graph illustrating a fundamental wave component of a displacement signal based on the optical encoder of the prior art.

A fifth embodiment is shown in FIG. 10. In this configuration, a first diffraction grating 100 is a phase grating, and directly opposing it is not a second diffraction grating but a photo detector as a light receiving unit 104. Similar to the above-mentioned embodiments, a relative displacement of the two diffraction gratings is calculated by an operation unit 109 based on the output of the photo detector. The first diffraction grating 100 has a thickness L for removing the zeroth-order diffracted light component. The photo detector 104 has a grating shape as shown in FIG. 11. The width of each part of the device is half of grating pitch P of the first diffraction grating. Photo detector 104 receives the light beam diffracted by the first diffraction grating 100. Since this light beam does not include the zeroth-order diffracted light, there is no interference of the first-order diffracted light and the zeroth-order diffracted light. The interference creates an interference fringe having the grating pitch periodic component. The half grating pitch periodic component from the interference of light of order ±1 becomes the fundamental wave component. This light of order ±1 is the interference among components having equal optical path lengths so is not susceptible to the influence of changes in the grating gap. This interference light is received directly by photo detector 104.

Photo detector 104 obtains multiple displacement signals a, b, a/, and b/ having different phases in order to interpolate the positions. Light receiving devices for a, b, a/, and b/ are arranged alternately as illustrated, and arranged in an intermingled and evenly dispersed manner on photo detector 104. Since the devices have a phase difference of 90 degrees with respect to each other in this example, the period of adjacent devices as illustrated is 5P/8. In this case, with respect to the light receiving device for "a" on the right end shown in FIG. 11, the next light receiving device for "a" is at a position 5P/2+P/20 to the left although it should be at 5P/2. The reason is that the period is modulated with the light receiving devices located at positions of 5P+2P/15 and 15P/2+P/12 so that the third- and fifth-order distortion components are eliminated. This method of period modulation enables other high-order distortion components to be eliminated.

Although examples were given in the embodiments described so far where the period or width of the second diffraction grating is modulated as methods to remove the distortion components of the displacement signal, these may be provided in the first diffraction grating. In this case, the first diffraction grating may be a phase grating, or a conventional amplitude modulation grating. Furthermore, up to this point, although examples were given where the period or width of ridges or transparent portions is modulated, the period or width of the grooves or nontransparent portions may be modulated. The modulation may be performed on the shape of the gratings or through another method. The elimination of the high-order distortion components through modulation of the grating pattern may be performed for multiple orders with respect to the odd-order distortion components of order 3, 5, 7, 11, 13, and so forth, for a certain order, or for distortion components of order 2 or even orders. Since a component of an even order can be removed by generating a signal with the phase of the displacement signal different by 180 degrees and taking the difference with the inverted signal, the removal may be performed in this manner at the displacement signal level. The phase grating may be used for both gratings. Furthermore, a reflective type of diffraction grating may be used. The emitted light beam may be coherent, such as from a laser diode, or incoherent, such as from an LED. The light beam may be parallel or nonparallel.

This invention can also be used in a linear or rotary encoder. This invention can also be used in an encoder provided with a phase grating on the circumference of a cylindrical member and utilizing Talbot interference. This invention is applicable when the pitch of the first grating and the average pitch of the second grating are nearly identical or when they are different, such as having a ratio of 1:2. Therefore, this invention Is not limited to the aforementioned embodiments.

According to the various embodiments described above, an optical encoder can be easily and compactly implemented without separating the diffracted light in a simple double-diffraction configuration where a pure sine wave displacement signal can always be obtained and the fundamental wave component of the displacement signal does not fluctuate even if the gap between gratings varies. The displacement signal is ½ the grating pitch and for this ½ pitch signal a sine wave displacement signal is obtained to enable a more precise positional detection. Therefore, high precision machining can be easily performed, such as in a machine tool, so that production efficiency can be increased.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. An optical encoder comprising:

two diffraction gratings superimposed together for changing the light intensity depending on the relative position, at least one diffraction grating being a phase grating alternately disposed with groove portions and ridge portions to furnish a different phase change for each incident light beam, said phase change being an elimination of the zeroth-order component of diffracted light created by the phase grating;

a light receiving unit for detecting light intensity that has passed said two diffraction gratings and for outputting an electric signal in proportion to the light intensity; and an operation unit for calculating the relative displacement of said two diffraction gratings based on the output of said light receiving unit.

2. The optical encoder according to claim 1 wherein at least one of said diffraction gratings is a diffraction grating for which a transmittance distribution along the direction of the grating pitch of the diffraction grating does not include a predetermined high-order Fourier component with respect to the fundamental period of the grating pitch.

3. The optical encoder according to claim 2, wherein one diffraction grating of said diffraction gratings, alternately disposed with groove portions and ridge portions to furnish a different phase change for each incident light beam, for eliminating the zeroth-order component of diffracted light, and the other diffraction grating of said diffraction gratings for which a transmittance distribution does not include a predetermined high-order Fourier component, said transmittance distribution being obtained by an array of transparent portions that pass a light beam and nontransparent portions that do not pass a light beam.

4. The optical encoder according to claim 3 wherein said other diffraction grating has an pitch of a constant value P, and widths W and W' of transparent portions expressed by:

$$W = P\left(\frac{n}{a} + \frac{1+2n'}{2b}\right)$$

$$W' = P\left(\frac{n}{a} - \frac{1+2n'}{2b}\right)$$

when the high-order Fourier components to be eliminated are an ath-order component and a bth-order component, where n and n' are integers.

5. The optical encoder according to claim 4 wherein the ratio of the sum of the widths of the transparent portions to the sum of the widths of the nontransparent portions in the entire said other diffraction grating is 1:1.

6. The optical encoder according to claim 5 wherein said other diffraction grating has a transmittance distribution not including the third-order and fifth-order Fourier components, the widths of the transparent portions being 23P/30, 17P/30, 13P/30, and 7P/30.

7. The optical encoder according to claim 2 wherein one diffraction grating of said diffraction gratings, alternately disposed with two regions to furnish a different phase change for each incident light beam, for eliminating the zeroth-order component of diffracted light, and at least one diffraction grating of said diffraction gratings for which a transmittance distribution does not include a predetermined high-order Fourier component.

8. The optical encoder according to claim 7 wherein said one diffraction grating furnishes, through a difference in thickness of said two regions, a different phase change for passing light beam, said one diffraction grating has a pitch of constant value P, and the widths of one region W and W' of transparent portions expressed by:

$$W = P\left(\frac{n}{a} + \frac{1+2n'}{2b}\right)$$

$$W' = P\left(\frac{n}{a} - \frac{1+2n'}{2b}\right)$$

when the high-order Fourier components to be eliminated are an ath-order component and a bth-order component, where n and n' are integers.

9. The optical encoder according to claim 8 wherein the ratio of the sum of the widths of the transparent portions to the sum of the widths of the nontransparent portions in the entire said one diffraction grating is 1:1.

10. The optical encoder according to claim 9 wherein said one diffraction grating has a transmittance distribution not including the third-order and fifth-order Fourier components, the widths of the transparent portions being 23P/30, 17P/30, 13P/30, and 7P/30.

11. The optical encoder according to claim 7 wherein said one diffraction grating furnishes, through a difference in thickness of said two regions, a different phase change for passing light beam, the widths of said two regions being equal, and the array pitch of one region being shifted by P/(2•a), P/(2•b), and P/(2•a)+P/(2•b) with respect to fundamental array pitch P when the high-order Fourier components to be eliminated are an ath-order component and a bth-order component.

12. The optical encoder according to claim 8 wherein an array pitch of a predetermined region is shifted by P/(2•c), P/(2•d), and P/(2•c)+P/(2•d) with respect to fundamental array pitch P when the high-order Fourier components to be eliminated are a cth-order component and a dth-order component.

13. The optical encoder according to claim 2 wherein said diffraction grating, for which said transmittance distribution does not include a predetermined high-order Fourier component, includes two zones, the transmittance distribution of one zone is shifted by ½ the fundamental period of the transmittance distribution with respect to the transmittance distribution of the other zone.

* * * * *